United States Patent
Wang et al.

(10) Patent No.: US 11,307,932 B2
(45) Date of Patent: Apr. 19, 2022

(54) REDUCED WRITE AMPLIFICATION FOR LARGE-BLOCK DATA LOG

(71) Applicant: VMware, Inc., Palo Alto, CA (US)

(72) Inventors: Wenguang Wang, Santa Clara, CA (US); Vamsi Gunturu, Cupertino, CA (US); Eric Knauft, San Francisco, CA (US)

(73) Assignee: VMware, Inc., Palo Alto, CA (US)

( * ) Notice: Subject to any disclaimer, the term of this patent is extended or adjusted under 35 U.S.C. 154(b) by 40 days.

(21) Appl. No.: 16/925,145

(22) Filed: Jul. 9, 2020

(65) Prior Publication Data

US 2022/0012131 A1 Jan. 13, 2022

(51) Int. Cl.
*G06F 11/14* (2006.01)
*G06F 11/07* (2006.01)
*G06F 3/06* (2006.01)

(52) U.S. Cl.
CPC ........ *G06F 11/1435* (2013.01); *G06F 3/064* (2013.01); *G06F 3/0619* (2013.01); *G06F 3/0673* (2013.01); *G06F 11/0787* (2013.01); *G06F 11/0793* (2013.01)

(58) Field of Classification Search
CPC ............. G06F 11/0787; G06F 11/0793; G06F 11/1435; G06F 3/0619; G06F 3/064; G06F 3/0673
See application file for complete search history.

(56) References Cited

U.S. PATENT DOCUMENTS 6,480,970 B1 * 11/2002 DeKoning .......... G06F 11/2069
714/5.11
2019/0278701 A1 * 9/2019 Enz ..................... G06F 12/0868

\* cited by examiner

*Primary Examiner* — Jigar P Patel

(57) ABSTRACT

Writing to a storage system with data striping includes storing blocks of data in local memory until one or more full-stripe write operations can be performed, thus reducing write amplification on the data striped storage system. Crash recovery information includes storing the data associated metadata to respective persistent storage devices. Metadata associated with data from several clients is combined into fixed-size data blocks and stored on the respective persistent storage device.

20 Claims, 10 Drawing Sheets

| data blocks to be written | blocks written | write amplification | |
|---|---|---|---|
| $B_0$ | $B_0, P_1, Q_1$ | 3 | partial-stripe writes |
| $B_0, B_1$ | $B_0, B_1, P_1, Q_1$ | 2 | |
| $B_0, B_1, B_2$ | $B_0, B_1, B_2, P_1, Q_1$ | 1.67 | |
| $B_0, B_1, B_2, B_3$ | $B_0, B_1, B_2, B_3, P_1, Q_1$ | 1.5 | full-stripe write |

REDUCED WRITE AMPLIFICATION FOR LARGE-BLOCK DATA LOG

CROSS REFERENCE TO RELATED APPLICATIONS

This application is related to concurrently filed U.S. application Ser. No. 16/925,168 entitled "Reduced Write Amplification Using Small-Block Log," the content of which is incorporated herein by reference in its entirety for all purposes.

The logical log is a basic building block in many storage systems such as file systems, databases, disk array, etc. Each log entry in a logical log is typically small, often a few dozen bytes. However, block-oriented devices use fixed-size blocks; a common size being 4 KB. Accordingly, when the amount of outstanding I/O (OIO) is low, a high write amplification happens on the logical log. Because the logical log is in the write path and must be flushed to disk before the client can be acknowledged, the write amplification to the logical log can significantly increase latency. This is especially true in the case of multiple instances of logical logs (such as one log each on a local file system or database in a virtual machine), where each log instance only needs to write a few dozen bytes due to low OIO.

BRIEF DESCRIPTION OF THE DRAWINGS

With respect to the discussion to follow and in particular to the drawings, it is stressed that the particulars shown represent examples for purposes of illustrative discussion, and are presented in the cause of providing a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. Similar or same reference numbers may be used to identify or otherwise refer to similar or same elements in the various drawings and supporting descriptions. In the accompanying drawings.

DETAILED DESCRIPTION

In the following description, for purposes of explanation, numerous examples and specific details are set forth in order to provide a thorough understanding of embodiments of the present disclosure. Particular embodiments as expressed in the claims may include some or all of the features in these examples, alone or in combination with other features described below, and may further include modifications and equivalents of the features and concepts described herein.

Figure 1:
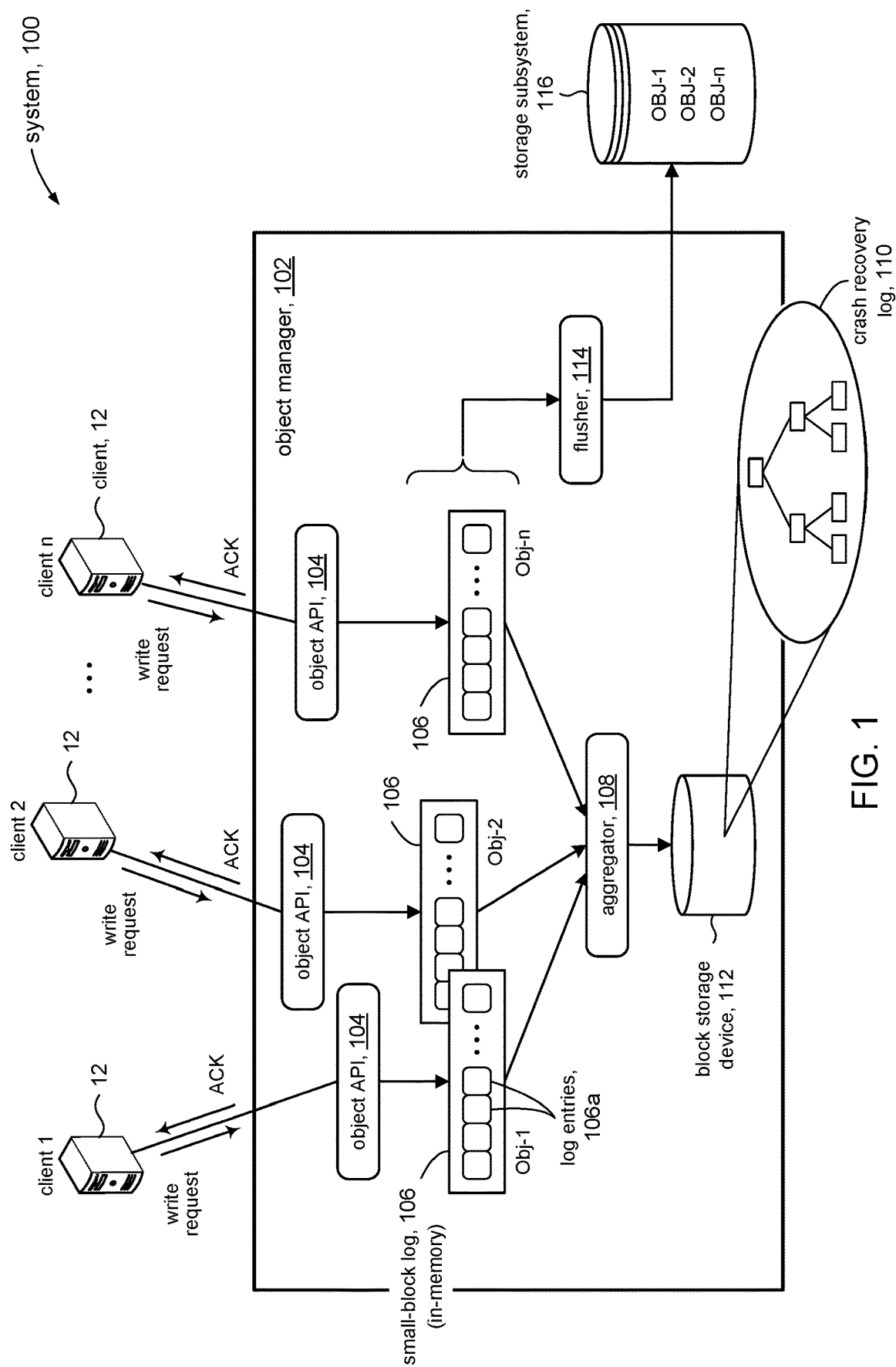
FIG. 1 shows an illustrative embodiment for processing small-block log in accordance with the present disclosure.

FIG. 1 shows a system in accordance with some embodiments of the present disclosure. System 100 can include object manager 102 for managing data objects in accordance with the present disclosure. Data objects can include any kind of data. Data objects can be system-level structures such as an entire file system, a database system, and the like. Data objects can be binary large objects (blobs), such as video files, audio files, image files, and so on.

Object manager 102 can provide suitable interfaces, e.g., application programming interfaces (APIs) such as object APIs 104, to expose various functionality to clients 12 to operate on a data object. Object APIs 104 can expose functionality such as read, write, modify, create, delete, and the like. In accordance with some embodiments, object manager 102 operates in terms of blocks of data on a storage subsystem 116. Write requests from clients 12 can be expressed in terms of a logical block address (LBA) in the storage subsystem 116, and the data to be written. For example, if a user on client 1 writes to a file called "foo.txt," client 1 can convert the file-level write request to a block-level write request that is expressed in terms of blocks that comprise the file "foo.txt." In accordance with some embodiments, when a client sends a write request to object manager 102, the client can wait for an ACK from the object manager before sending another write request.

In some instances, the write request from each client 12 accesses a different data object. In other instances, write requests from clients 12 may access the same data object. For discussion purposes, however, the present disclosure will use as an illustrative example a configuration where each write request accesses a different data object. FIG. 1, for example, shows that client 1 accesses object Obj-1, client 2 accesses object Obj-2, client n accesses object Obj-n, and so on.

Object manager 102 can include a small-block log (logical log) 106 that is associated with each data object. In some embodiments, each small-block log 106 is a region of memory in the computer-resident memory of the object manager, such as the random-access memory (RAM) of a computer system on which the object manager executes. Each small-block log 106 can be a list of log entries 106a that store the data associated with a write request received from a client 12. In some embodiments, the log entries can be small, for example, on the order of 64 bytes to 128 bytes.

Object manager 102 can include aggregator 108 to aggregate small-block logs 106 in accordance with the present disclosure to generate a crash recovery log (crash recovery information) 110. Crash recovery log 110 can be stored in a persistent block-oriented storage device 112, where read and write requests occur in fixed-size blocks of data. A common data size is 4 KB blocks ($1K=2^{10}=1024$), although other fixed-size blocks are possible. In some embodiments, for example, storage device 112 can be a solid-state drive (SSD).

The crash recovery log 110 can be organized in any suitable manner. In some embodiments for example, the crash recovery log 110 can be organized as a data tree such as a log-structured merge (LSM) tree. It will be appreciated that other data tree organizations can be used, for example, $B^\varepsilon$ trees.

Object manager 102 can include a flusher 114 to write out (flush) log entries in the small-block logs 106 to storage subsystem 116. Flusher 114 can periodically write out the data stored in the log entries of each small-block log 106 to corresponding data objects stored on the storage subsystem 116, thereby updating the actual data objects.

Although not shown, it will be appreciated that in some embodiments object manager 102 can be mirrored to improve reliability. In some embodiments, for example, write requests from the clients can be mirrored to mirror sites in a 3-way mirror.

Figure 2A:
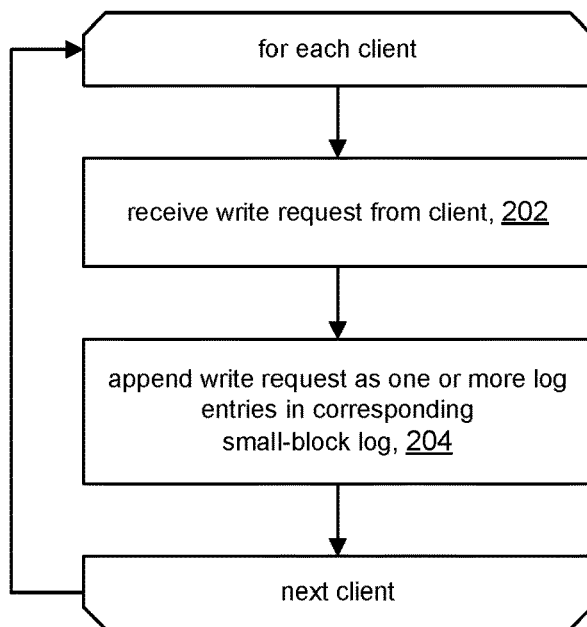
FIG. 2A shows operations for processing client-issued write requests using small-block logs in accordance with the present disclosure.

Referring to FIG. 2A, the discussion will now turn to a high level description of operations and processing in object manager 102 (e.g., object API 104) to log write requests received from clients 12 in accordance with the present disclosure. In some embodiments, for example, object manager 102 can include one or more computer processors (e.g., 902, FIG. 9) and computer executable program code, which when executed by the computer processor(s), can cause the object manager to perform processing in accordance with FIG. 2A. The operation and processing blocks described below are not necessarily executed in the order shown, and can be allocated for execution among one ore more concurrently executing processes and/or threads.

FIG. 2A shows processing of write requests received by each client. In some embodiments, for example, the object manager can process write requests from each client 12 (e.g., via object API 104) as follows:

At operation 202, the object manager can receive a write request from a client (e.g., client 1). In some embodiments, for example, the write request can specify (1) a data object identifier, (2) an LBA on storage subsystem 116, (3) the data to be written ("write data"), and (4) a data size parameter that indicates how much data is to be written. The data object identifier identifies the data object that is the target of the write data. The LBA identifies the logical block in the data object to store the write data, and may include more than one block depending on the data size parameter.

At operation 204, the object manager can log the write data as one or more log entries 106a in the small-block log 106 (logical log) that corresponds to the data object identified in the received write request. Logging the write request provides faster throughput as compared to immediately flushing the data out to the data object on storage subsystem 116. The write request can be logged and later written out by the flusher 114. In some embodiments, each log entry 106a can include the LBA specified in the received write request and the corresponding write data. Data in the received write request may be divided or otherwise split into two or more blocks and stored in the small-block log 106 as two or more log entries, depending on the amount of data in the received write request. For example, suppose the received write request contains N bytes of write data and each log entry can hold n bytes of data. The received write request would require m=(N/n) log entries in the associated small-block log. For example, 1 KB of write data would require 16 64-byte log entries. The one or more new log entries can be appended to the small-block log. Processing of the received write request can be deemed complete.

Before the client proceeds with sending the next write request, the client will wait for an acknowledgement (ACK) from the object manager. Recall that in some embodiments, the small-block logs 106 are regions in the main memory of the underlying computer system of the object manager. If the computer system crashes or main memory is otherwise compromised, logged write requests that have not yet been written to the storage subsystem 116 can be lost, resulting in inconsistency between what the client thinks is on the storage subsystem and what is actually on the storage subsystem. In order to ensure data consistency, the object manager can persist the newly added log entries for crash recovery purposes. If a crash occurs, the object manager can read the persisted log entries to rebuild the small-block logs during crash recovery. The ACK can serve to indicate to the client that its write request has been (1) logged in the small-block log and (2) persisted (committed) for crash recovery purposes. The discussion will now turn to a description of this latter aspect of the present disclosure.

Figure 2B:
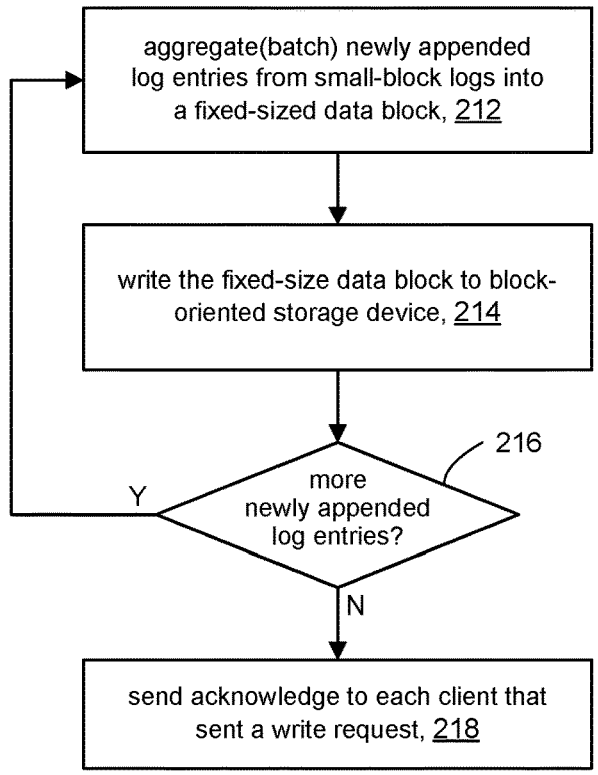
FIG. 2B shows operations for persisting small-block logs in accordance with the present disclosure.

Referring to FIG. 2B, the discussion will now turn to a high level description of operations and processing in object manager 102 (e.g., aggregator 108) to persist write requests received from clients 12 in accordance with the present disclosure. As explained above, object manager 102 can include one or more computer processors (e.g., 902, FIG. 9) and computer executable program code, which when executed by the computer processor(s), can cause the object manager to perform processing in accordance with FIG. 2B. The operation and processing blocks described below are not necessarily executed in the order shown, and can be allocated for execution among one ore more concurrently executing processes and/or threads.

Log entries that are added to the small-block logs per the processing described above in FIG. 2A can be referred to as newly added log entries, and can be processed in accordance with FIG. 2B as follows:

At operation 212, the object manager can aggregate or otherwise batch together newly appended log entries 106a from each of the small-block logs 106 into one or more fixed-size data blocks. In accordance with the present disclosure, the size of the fixed-size data blocks can match the I/O block size of the block-oriented storage device 112. A common block size is 4 KB, but it will be appreciated that other block sizes are possible, depending on the particular block storage device being used. For discussion purposes, suppose the block storage device 112 uses 4 KB blocks. Accordingly, the fixed-size data block would be 4 KB.

In some embodiments, the newly added log entries 106a from each small-block log 106 can be copied to a 4 KB region in computer memory. For example, in a particular embodiment, suppose we have 64 small-block logs and the log entries are 64 bytes each. A 4 KB region of memory can hold one log entry from each of the 64 small-block logs (4K=64×64). If, instead, we have 32 small-block logs, then a 4K memory region can hold two log entries from each of the 32 small-block logs.

In other embodiments, the newly added log entries 106a from each small-block log 106 can be copied to more than one 4 KB region in computer memory. For example, if we have 64 small-block logs with log entries that are 128 bytes, then two 4 KB memory regions are needed: one 4 KB region of memory can hold one log entry from each of the first 32 small-block logs and another 4 KB region of memory can hold one log entry from each of the next 32 small-block logs.

At operation 214, the object manager can write the one or more fixed-size (e.g., 4 KB) data blocks generated at operation 212 to the block storage device 112. In some embodiments, for example, the block storage device 112 can be a solid state drive (SSD) to provide high write throughput. In some embodiments, each fixed-size data block can be inserted into a data tree. In some embodiments, for example, the data tree can be a write-optimized tree such as log-structured merge (LSM) tree, and more generally can be any write-optimized tree such as a B$^\varepsilon$ tree and the like. Different small-block logs associated with different data objects are written to the same data tree by virtue of their log entries being aggregated or batched in the same 4 KB data blocks and written out to the tree. The use of a write optimized data structure allows different log entries from different logs to be aggregated efficiently into a few blocks and reduces the write amplification.

At operation 216, the object manager can determine whether there are any more new log entries among the small-block logs to be processed. In some embodiments, each small-block log can have associated pointers, counters, or other metadata to facilitate determining whether or not the small-block log has additional new log entries to process. If there are more newly appended log entries to process, the processing can return to operation 212. The loop between operation 212 and operation 216 can continue until all newly added log entries from the current round of write requests have been persisted (committed) to the crash recovery log. If there are no more newly appended log entries to process, processing can proceed to operation 218.

At operation 218, the object manager can ACK each client that sent a write request. The ACK ensures that when a client sends a write request to the object manager that client will not send another write request until the previous one has been committed. In some embodiments, the ACK can be an acknowledgement message that the object manager sends to the client. In other embodiments, the object API 104 can be a write function that the client invokes, and the ACK can be the write function returning from the function call.

Figure 3A:
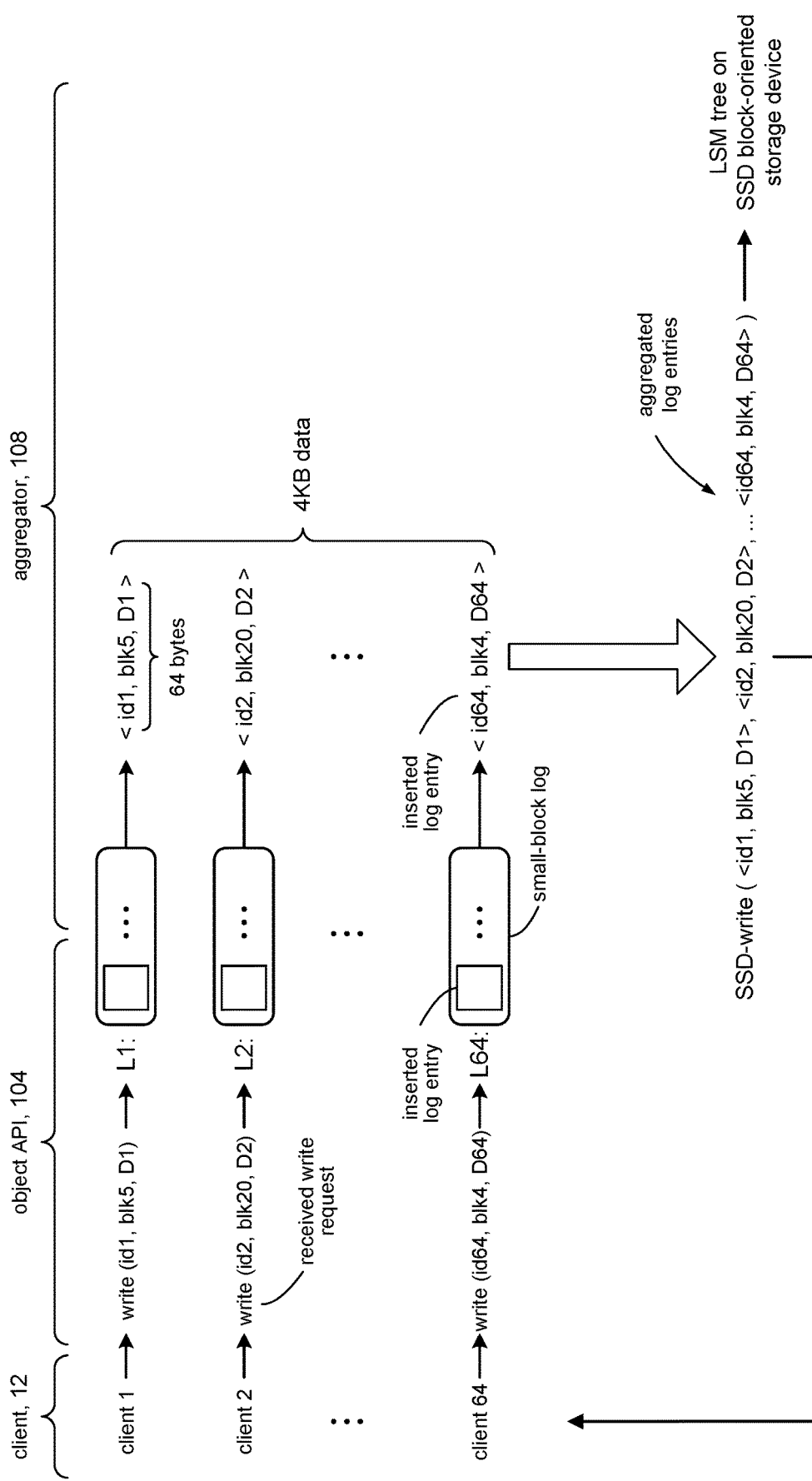
FIGS. 3A and 3B illustrate the operations described in FIGS. 2A and 2B.
Figure 3B:
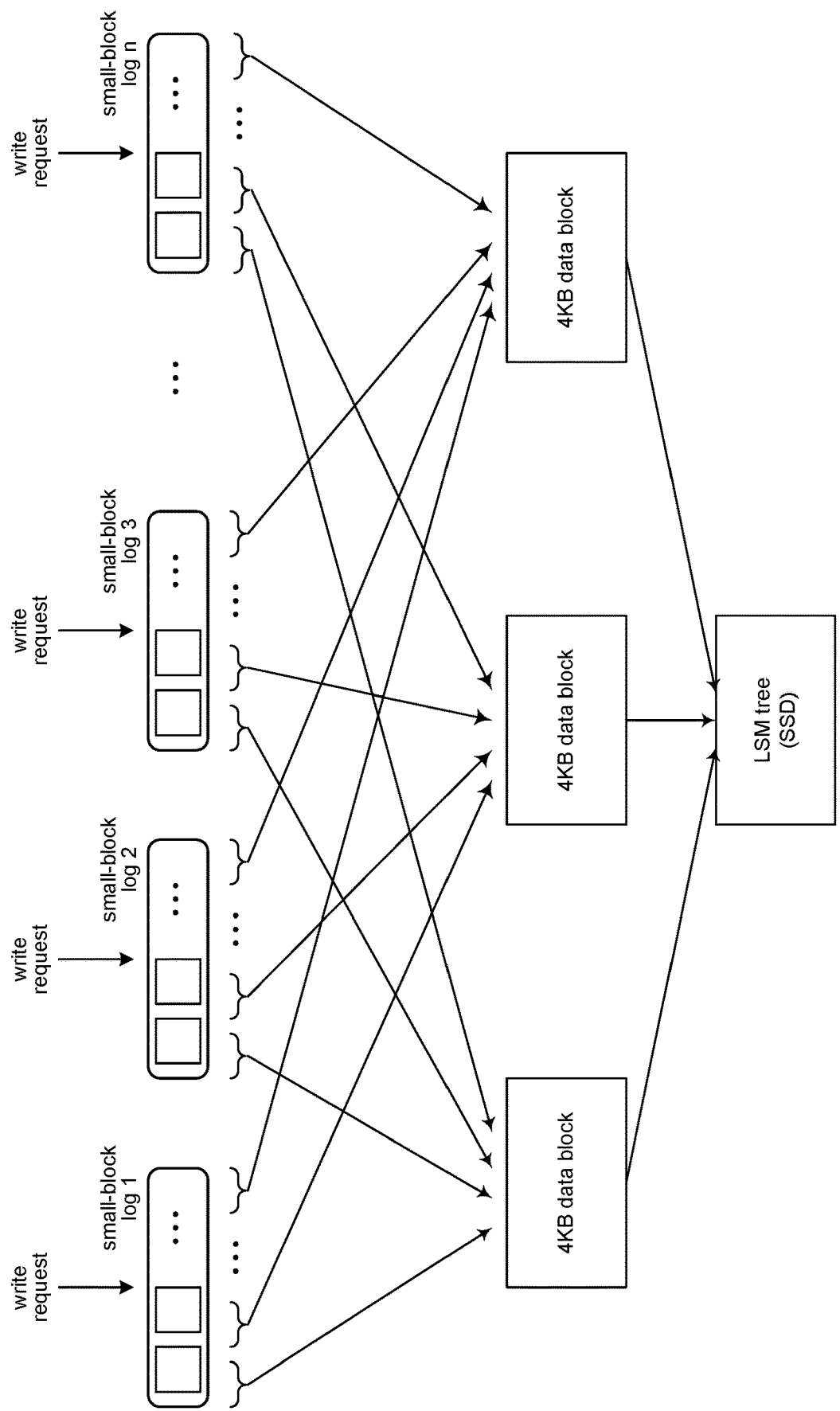

FIG. 3A illustrates the processing described in FIGS. 2A and 2B with an example. The example shows 64 clients (client 1 to client 64) writing to respective data objects (id1 to id64). For instance, client 1 writes an amount of data D1 to block blk5 of data object id1. Client 2 writes an amount of data D2 to block blk20 of data object id2, and so on. In this example, each write request generates one 64-byte log entry that is appended to a corresponding small-block log, for example, the write request write (id1, blk5, D1) generates one log entry in small-block log L1, the write request write (id2, blk20, D2) generates one log entry in small-block log L2, and so on. It will be appreciated that in general, a write request may generate more than one log entry. The aggregator 108 can take one log entry from each small-block log and aggregate them into a 4 KB data block. Referring for a moment to FIG. 3B, it is noted that more generally, one or more log entries from each small-block log can be written to a 4 KB block, depending on the number of small-block logs and the size of the log entries. As illustrated in FIGS. 3A and 3B, each 4 KB data block is then inserted to the LSM tree on the SSD, noting as mentioned above, that the individual small-block logs are stored on the same LSM tree. An ACK is transmitted when the write request to the SSD is completed, to signal the clients that their write requests have been committed.

The discussion will now turn to a brief description of operation of flusher 114. The small-block logs 106 gradually grow as write requests are received and processed. Because the small-block logs have finite size, they are flushed every now and again to prevent memory overflow. Flusher 114 can write out the data in each log entry of a small-block log to the storage subsystem 116 using the LBA information in that log entry. The small-block log can be reset or cleared when its log entries have been written to the storage subsystem 116. Flusher 114 can be activated in response to the occurrence of any suitable event. In some embodiments, for instance, the event can be the expiration of a timer. In other embodiments, the event can be a memory usage signal; for example, when a small-block log is at some percentage of full capacity, a memory usage signal can be asserted. In some embodiments, flusher 114 can be manually invoked, for example, by a system administrator.

It can be appreciated from the foregoing that both write latency and write amplification in a storage system (e.g., storage subsystem 116) that uses logical logs can be reduced. In accordance with the present disclosure, latency can be reduced by logging write requests to logical logs (e.g., small-block logs 106) in high-speed computer memory rather than immediately flushing the data to the slower storage subsystem 116. The small-block logs can be flushed to the slower storage subsystem 116 on an as-needed basis independent of when clients issue the write requests.

In order to avoid loss of data, and hence data corruption, in the event that the system crashes before the small-block logs can be flushed, the small-block logs can be persisted on SSD-based block storage device 112 in order to provide crash recovery information. Because small-block logs are small (e.g., in some embodiments on the order of a hundred bytes or so) by comparison to the 4 KB block sizes of a block storage device, writing a few log entries at a time can result in write amplification.

As explained above, write operations to a block-oriented storage device occur in fixed-size blocks; e.g., 4 KB blocks. Therefore, a 4 KB block is always written to the block device even though the amount of data that actually needs to be written may be less than 4 KB. This is sometimes referred to as write amplification, where a write operation of less than 4 KB of actual data is "amplified" to a write operation of a fixed-size 4 KB data block on the block storage device. Write amplification can result in wasted storage if each write operation involves only a small amount of data as compared to the fixed-sized data block. If each write operation involves only 64 bytes of data, for example, we see this can represent a good deal of wasted space.

In accordance with the present disclosure, crash recovery information can be generated by aggregating the small-block logs 106 (e.g., 64-byte log entries 106a) into fixed-size data blocks and then flushing the fixed-size data blocks out to the block storage device. By first aggregating log entries from all the small-block logs, most of the 4 KB data blocks that are flushed will be filled up, thus reducing write amplification.

In the event of a system crash, data stored in the small-block logs 106 that had not yet been written to the storage subsystem 116 can be lost, corrupted, or otherwise no longer available. The crash recovery process can include reading the log entries stored in the crash recovery log, and reconstructing each small-block log 106.

Figure 4:
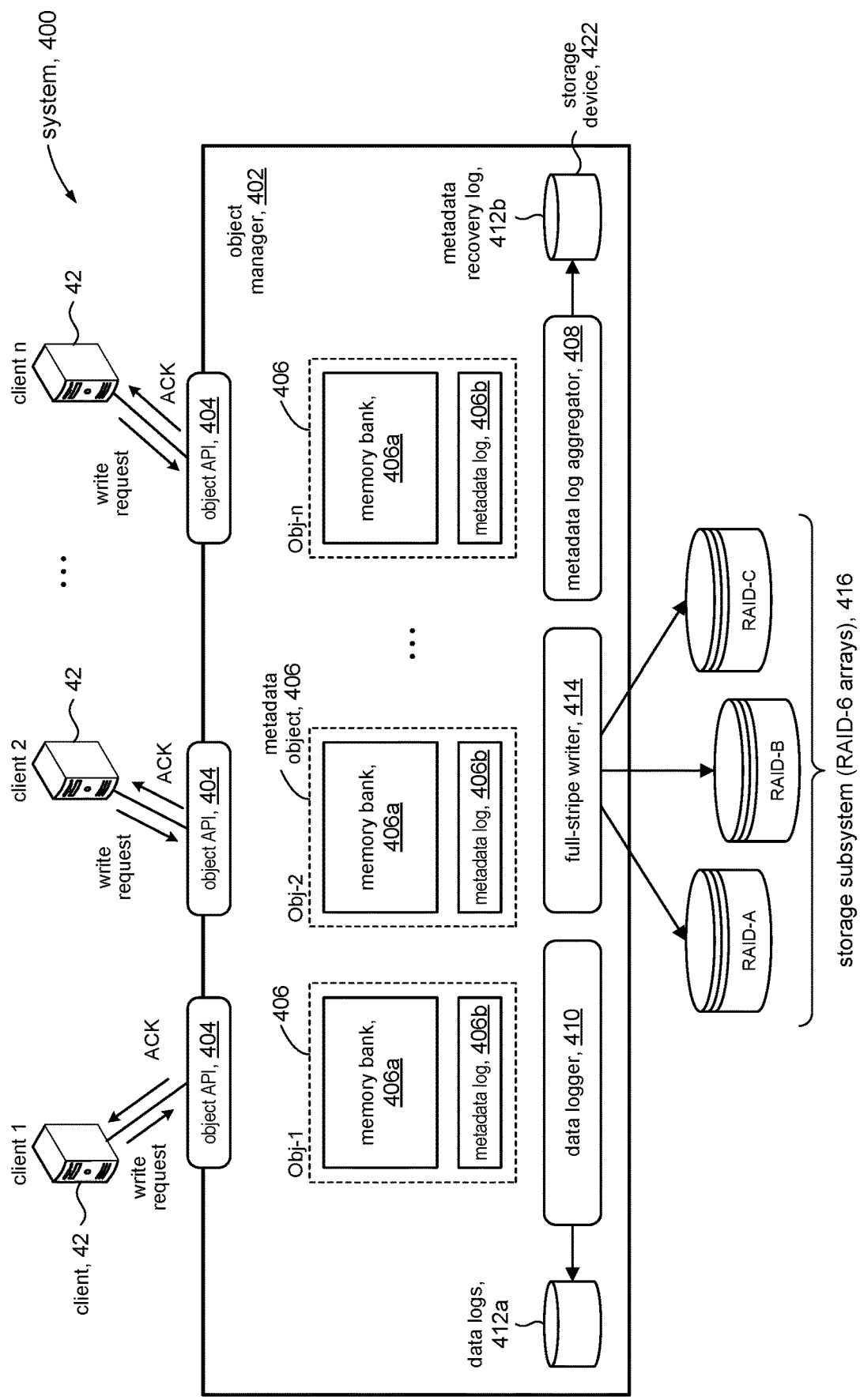
FIG. 4 shows an illustrative embodiment for data striped storage with parity information in accordance with the present disclosure.

FIG. 4 shows a system in accordance with some embodiments of the present disclosure. System 400 can include object manager 402 for managing data objects in accordance with the present disclosure. As mentioned above, data objects can include any kind of data. Data objects can be system-level structures such as an entire file system, a database system, and the like. Data objects can be binary large objects (blobs), such as video files, audio files, image files, and so on.

Object manager 402 can provide suitable interfaces (e.g., application programming interfaces (APIs) such as object APIs 404), to expose various functionality to clients 42 to operate on a data object. Object APIs 404 can expose functionality such as read, write, modify, create, delete, and the like. In accordance with some embodiments, object manager 402 operates in terms of blocks of data on a storage subsystem 416. Write requests from clients 42 can be expressed in terms of a logical block address (LBA) or range of LBA's in the storage subsystem 416, and the data to be written. In accordance with some embodiments, when a client sends a write request to object manager 402, the client can wait for an ACK from the object manager before sending another write request.

In some instances, each client 42 can access its own respective data object. In other instances, a data object can be accessed by more than one client. For discussion purposes, however, the present disclosure will use as an illustrative example, a configuration where each client accesses its own respective data object. FIG. 4, for example, shows that client 1 accesses object Obj-1, client 2 accesses object Obj-2, client n accesses object Obj-n, and so on.

Object manager 402 can provide data striping with parity information for the data objects it manages. In some embodiments, for example, storage subsystem 416 can be a redundant array of inexpensive (or independent) disks (RAID) array. For example, storage subsystem 416 can include one or more RAID-6 storage arrays. RAID-6 is a configuration that provides data striping with parity. FIG. 4 shows that storage subsystem 416 comprises three RAID-6 arrays to provide storage for the data objects managed by object manager 402. It will be appreciated that in other embodiments, storage subsystem 416 can comprise more or fewer RAID-6 arrays. It will be appreciated that other architectures that provide data striping with parity information can be used and that the RAID-6 architecture serves merely as an example for discussion purposes.

Figures 5, 6:
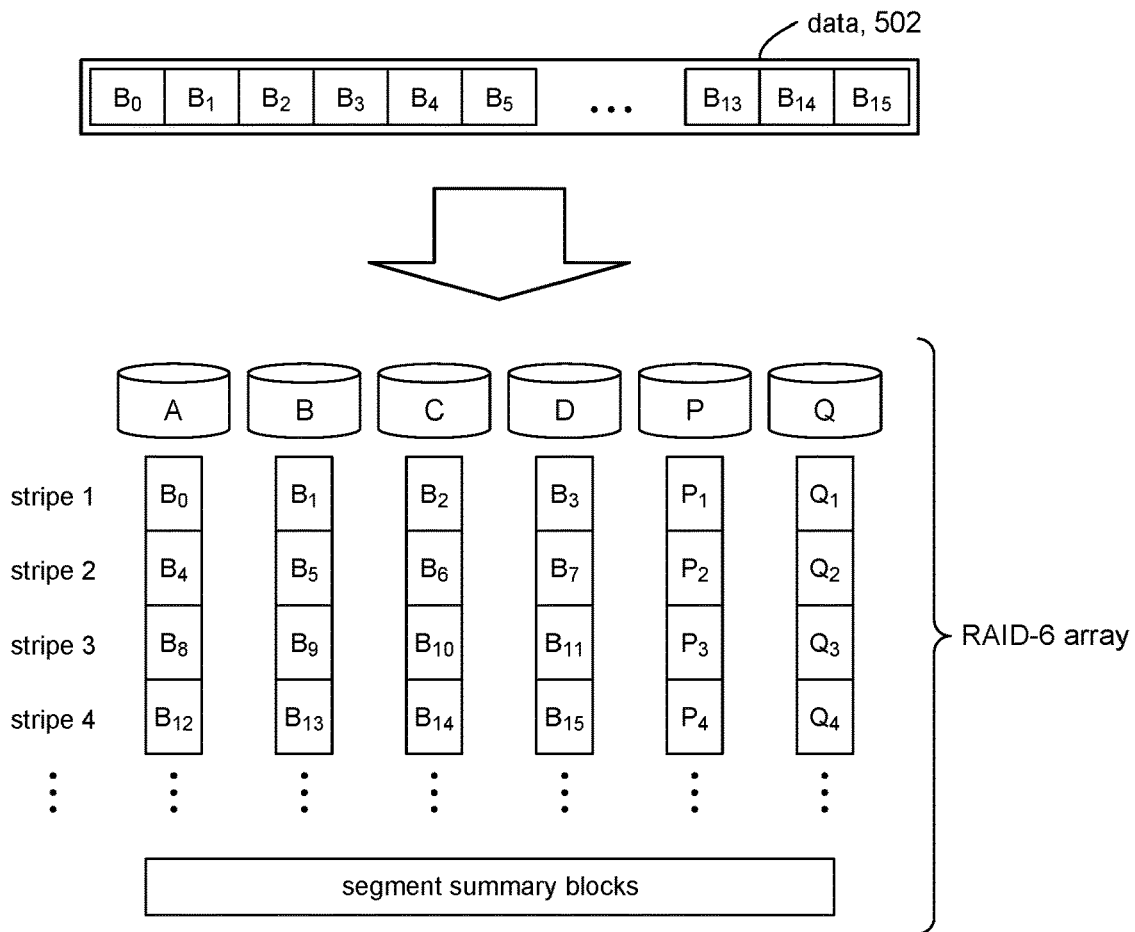
FIG. 5 shows details for a RAID-6 storage array.
FIG. 6 illustrates write amplification in a RAID-65 array.

Although the RAID-6 architecture is known, a brief description is provided. Referring for a moment to FIG. 5, a 4+2 RAID-6 array is shown, comprising four data disks (A, B, C, D) and two parity disks (P, Q). Other RAID-6 configurations are possible having greater (or fewer) numbers of data disks. The disks in a RAID-6 array can be block-oriented storage devices, and in some embodiments can be solid state devices (SSD's). Data 502 is written out to the RAID-6 array as stripes of blocks. For example, blocks $B_0$-$B_3$ are stored respectively on disks A-D as stripe 1. Parity information $P_1$, $Q_1$ are computed from blocks $B_0$-$B_3$ and stored in disks P and Q. Likewise, blocks $B_4$-$B_7$ are stored on disks A-D as stripe 2, respectively. Parity information $P_2$, $Q_2$ are computed from blocks $B_4$-$B_7$ and stored in disks P and Q, and so on.

Write amplification can arise in a RAID-6 array, and is explained with reference to FIG. 6. When a stripe is written, the parity information is computed and written to the parity disks. Parity is computed and written irrespective of whether the strip involves one or all of the data disks. Referring to FIG. 6, for instance, if only one block (e.g., $B_0$) in stripe 1 needs to be written to a data disk, the actual number of blocks written will be three: one data block ($B_0$) and two parity block ($P_1$, $Q_1$); this is referred to as a partial-stripe write. Although not shown, computing the parity blocks $P_1$, $Q_1$ for stripe 1 requires accessing the other blocks in the stripe, namely $B_1$-$B_3$. Write amplification arises because of the need to write the parity disks with each stripe, and decreases as more data disks are written per stripe. In a 4+2 RAID-6 configuration, write amplification varies from a maximum of 3 to a minimum of 1.67. Since the disks are written in parallel, the time it takes to write one block on one data disk is the same as it takes to write four blocks to four data disks. It can be appreciated that the maximum amount of data is transferred when the write operation is a full-stripe write as compared to write operations that are a partial-stripe write. Reducing write amplification in the context of RAID-6, therefore, corresponds to increasing the amount of data transferred per write operation.

Continuing with the description of system 400 in FIG. 4, object manager 402 can include computer memory (e.g., RAM, not shown in FIG. 4) to provide data structures, metadata objects 406, to support client write requests on the data objects. In some embodiments, each metadata object 406 can include a memory bank 406a and a metadata log 406b.

Object manager 402 can include a data logger 410 to log data contained in received write requests (write data) to one or more data logs 412a. In some embodiments, data logs 412a can be a persisted on a suitable block storage device, such as an SSD block storage device. Data objects managed by the object manager can each have a corresponding data log on the storage device.

Object manager 402 can include metadata log aggregator 408. In accordance with the present disclosure, the metadata logs 406b can be aggregated by the metadata log aggregator 408 and persisted in a metadata recovery log 412b, such as on SSD storage device 422.

Object manager 402 can include a full-stripe writer 414. In accordance with the present disclosure, the full-stripe writer 414 can perform full-stripe writes to the RAID-6 based storage subsystem 416 when a memory bank has enough data for a full-stripe write.

Figure 7A:
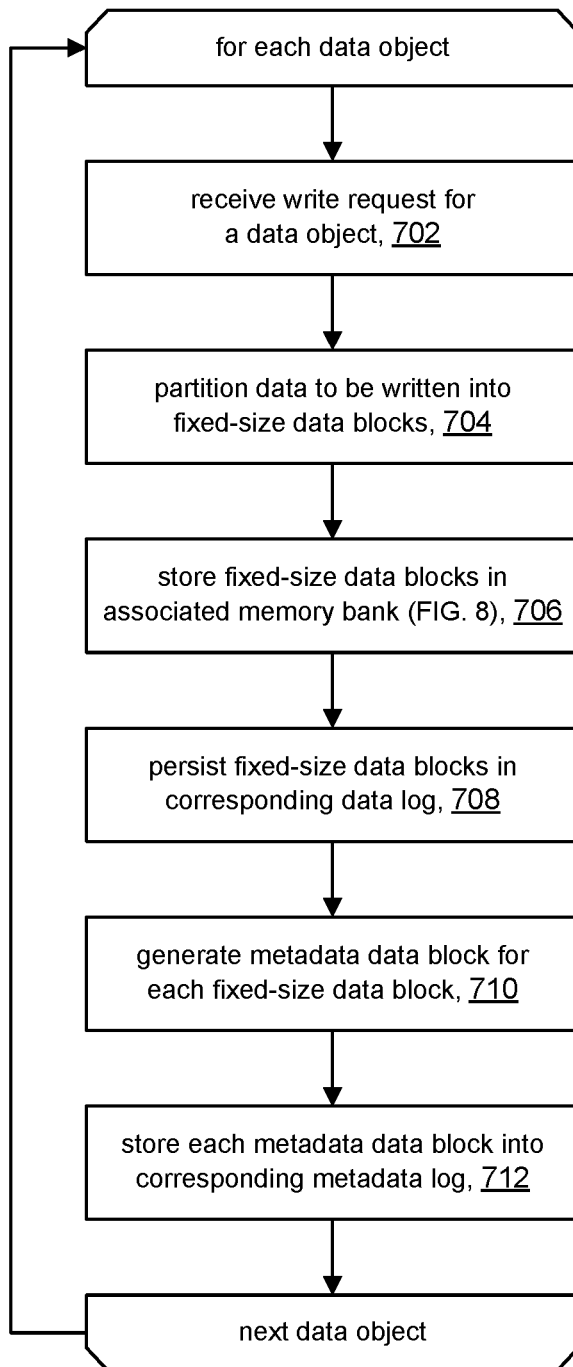
FIG. 7A shows operations for processing client-issued write requests in accordance with the present disclosure.

Referring to FIG. 7A, the discussion will now turn to a high level description of operations and processing in object manager 402 (e.g., object API 404) to log write requests received from clients 42 in accordance with the present disclosure. In some embodiments, for example, object manager 402 can include one or more computer processors (e.g., 902, FIG. 9) and computer executable program code, which when executed by the computer processor(s), can cause the object manager to perform processing in accordance with FIG. 7A. The operation and processing blocks described below are not necessarily executed in the order shown, and can be allocated for execution among one ore more concurrently executing processes and/or threads.

FIG. 7A shows processing of write requests received by each client. In some embodiments, for example, object manager 402 can process write requests from each client 42 (e.g., via object API 404) as follows:

At operation 702, the object manager can receive a write request from a client (e.g., client 1). In some embodiments, for example, the write request can specify (1) a data object identifier, (2) an LBA on storage subsystem 416, and (3) the data to be written ("write data") into the block(s) specified by the LBA. The data object identifier identifies the data object that is the target of the write data. The LBA identifies the logical block(s) of the data object.

At operation 704, the object manager can partition the data (write data) contained in the received write request into one or more fixed-size data blocks. In some embodiments, the fixed-size data blocks are the same size as a RAID-6 data block, which in our illustrative examples is 4 KB. For instance, a write request for 32 KB of data can generate eight 4 KB data blocks.

At operation 706, the object manager can store the fixed-size data blocks in the main memory of the object manager, such as in RAM. For example, as shown in FIG. 4, the main memory can hold a metadata object 406 for each data object that is managed by the object manager. The fixed-size data blocks can be stored in the memory bank 406a component of the metadata object corresponding to the data object identified in the received write request. In some embodiments, the memory bank can be sized to hold one or more full stripes of data for the RAID-6 array, for example, four (or more, e.g., 128) 4 KB blocks per stripe in a 4+2 array.

At operation 708, the object manager can persist the fixed-size data blocks in a data log 412a for crash recovery purposes, in addition to storing them in a memory bank 406a. In some embodiments, each block of data that is stored in the memory bank at operation 706 can be persisted on data log 412a, such as a solid state drive (SSD). Because the memory banks 406a are in main memory, a system crash can result in the loss of data before the data can be flushed from the memory banks to the storage subsystem 416. The data log 412a can be used to rebuild the memory banks after a system crash. It is noted that the SSD is not configured as a RAID-6 device, so the write operation does not involve data striping.

At operation 710, the object manager can generate a metadata data block corresponding to each fixed-size data block generated at operation 704. In some embodiments, the metadata data block can include information that can be used for crash recovery in order to rebuild the fixed-size data blocks stored in memory banks 406a. For example, the metadata can include information such as the data block's LBA in the storage subsystem 416, a cyclic redundancy check (CRC) checksum, a size parameter if the data block is compressed, a secure hash algorithm (SHA) hash (e.g., for deduplication), and so on. The amount of data in the metadata can be small (e.g., on the order of several dozens of bytes) compared to the size of the data block (e.g., 4 KB) that the metadata corresponds to.

At operation 712, the object manager can store the metadata data block computed at operation 710 to the metadata log 406b associated with the data object. In some embodiments, each new metadata data block is appended as a log entry in the metadata log. Processing of a write request received from a client can be deemed completed.

Figure 7B:
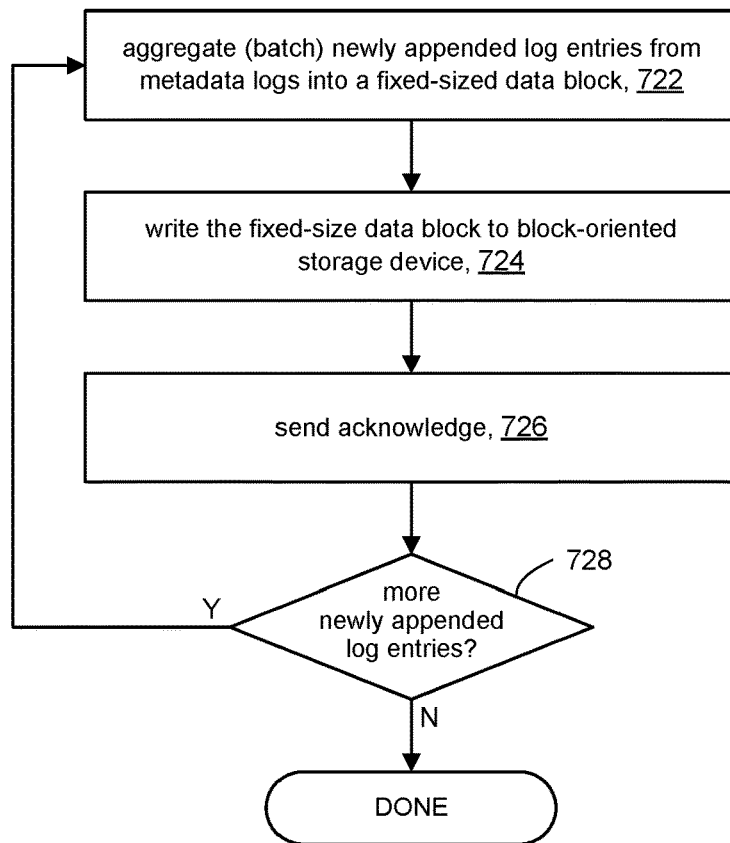
FIG. 7B shows operations for processing metadata logs in accordance with the present disclosure.

Referring to FIG. 7B, the discussion will now turn to a high level description of operations and processing in object manager 402 (e.g., metadata log aggregator 408) to persist the metadata logs 406b in accordance with the present disclosure. In some embodiments, for example, object manager 402 can include one or more computer processors (e.g., 902, FIG. 9) and computer executable program code, which when executed by the computer processor(s), can cause the object manager to perform processing in accordance with FIG. 7B. The operation and processing blocks described below are not necessarily executed in the order shown, and can be allocated for execution among one ore more concurrently executing processes and/or threads.

Log entries that are added to the metadata logs per the processing described above in FIG. 7A can be referred to as newly added log entries, and can be processed in accordance with FIG. 7B as follows:

At operation 722, the object manager can aggregate or otherwise batch together newly appended log entries from each of the metadata logs into one or more fixed-size data blocks. In accordance with the present disclosure, the size of the fixed-size data blocks can match the I/O block size of SSD storage device 422, which in our examples is 4 KB.

At operation 724, the object manager can write the one or more fixed-size (e.g., 4 KB) data blocks generated at operation 722 to the crash recovery log 412b. In some embodiments, for example, the crash recovery log can be stored on an SSD to provide high write throughput. In some embodiments, each fixed-size data block can be inserted into a data tree stored on the block storage device. In some embodiments, for example, the data tree can be a write-optimized tree such as log-structured merge (LSM) tree, and more generally any write-optimized tree can be used. The metadata logs associated with each data object are written to the same data tree by virtue of their log entries being aggregated or batched in the 4 KB data blocks and written out to the tree. It is noted that the SSD is not configured as a RAID-6 device, so the write operation does not involve data striping.

At operation 726, the object manager can ACK each client whose write requests were processed at operation 724. Acknowledging the client as soon as possible helps to reduce latency. The ACK ensures that each client will send one write request at a time to the object manager. In some embodiments, the ACK can be an acknowledgement message that the object manager sends to the client. In other embodiments, the object API 404 can be a write function that the client invokes, and the ACK can be the write function returning from the function call.

At operation 728, the object manager can determine whether there are any more new log entries among the metadata logs to be processed. In some embodiments, each metadata log can have associated pointers, counters, or other metadata to facilitate determining whether or not the metadata log has additional new log entries to process. If there are more newly appended log entries to process, the processing can return to operation 722. The loop between operation 722 and operation 726 can continue until all newly added log entries from the current round of client write requests have been persisted. If there are no more newly appended log entries to process, processing can be deemed to be complete.

Figure 7C:
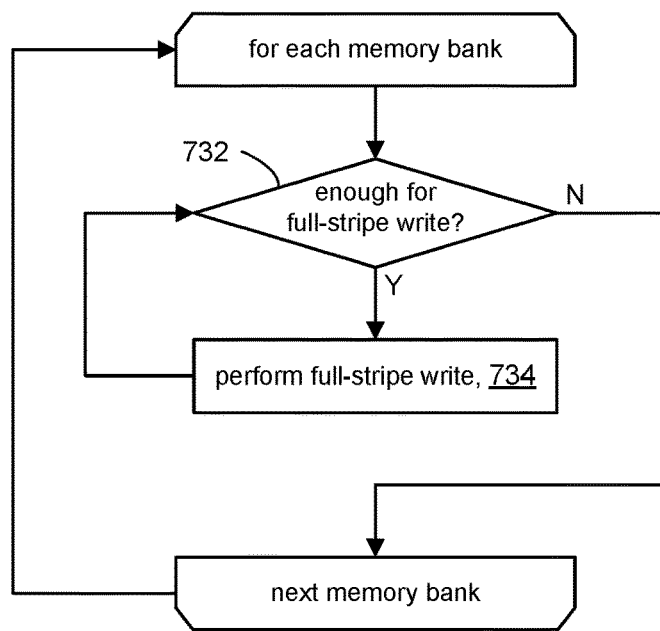
FIG. 7C shows operations for processing full-stripe writes in accordance with the present disclosure.

Referring to FIG. 7C, the discussion will now turn to a high level description of operations and processing in object manager 402 (e.g., full stripe writer 414) to flush data stored in memory banks 406a to data objects in storage subsystem 416 in accordance with the present disclosure. In some embodiments, for example, object manager 402 can include one or more computer processors (e.g., 902, FIG. 9) and computer executable program code, which when executed by the computer processor(s), can cause the object manager to perform processing in accordance with FIG. 7C. The operation and processing blocks described below are not necessarily executed in the order shown, and can be allocated for execution among one ore more concurrently executing processes and/or threads.

The object manger can process each memory bank 406a as follows:

At operation 732, the object manager can determine whether the memory bank contains enough 4 KB data blocks to perform a full-stripe write operation. In the 4+2 RAID-6 configuration, for example, when the memory bank contains at least four 4 KB data blocks, then those data blocks can be written to the RAID-6 array as a full stripe. When the memory bank contains enough 4 KB data blocks to perform a full-stripe write operation, processing proceeds to operation 734. When the memory bank does not contain enough 4 KB data blocks to perform a full-stripe write operation, the object manager does not flush any data from the memory bank and will wait for additional data to accumulate from subsequent write requests. Processing continues with the next memory bank.

At operation 734, the object manager can perform a full-stripe write on each group of four 4 KB data blocks stored in the memory bank. Parity information can be computed from the 4 KB data blocks, and a full-stripe write operation on the RAID-6 array can be invoked on the four 4 KB data blocks, which includes computing the two parity blocks and writing out the four data blocks and the two parity blocks. The metadata associated with each of the 4 KB data blocks can be written to the RAID-6 array in an area of the array referred to as the segment summary blocks (FIG. 5). This metadata can be used to verify the stored data blocks, for example, when processing read operations. Processing returns to operation 732 and repeats for every group of four 4 kB data blocks that are stored in the memory bank.

Figure 8:
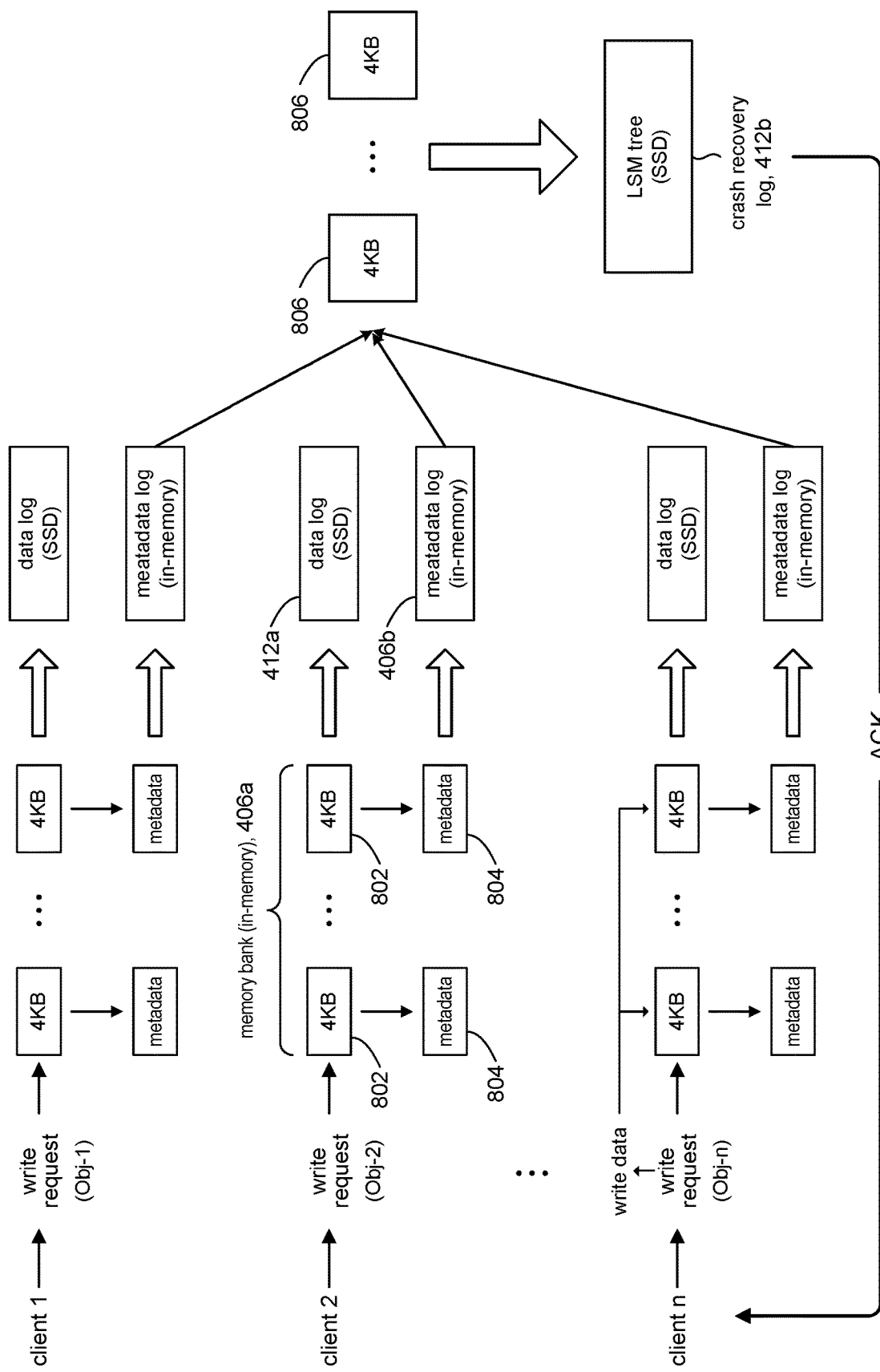
FIG. 8 illustrates the operations described in FIGS. 7A-7C.

FIG. 8 illustrates the processing described in FIGS. 7A-7C with an example. Each client issues a write request that identifies the data object that is the target of the write request and the data (write data) to be written. Each client that issues a write request will wait for an ACK before issuing the next write request. The write data comprising a write request (see, for example, client n) can be written into one or more 4 KB data blocks 802 in the memory bank 406a corresponding to the target data object. The write data can be persisted in a corresponding data log 412a. The data log can be provided on an SSD, for instance. As will be discussed below, the persisted data logs 412a preserve the write data for each write request in case of a crash.

Metadata 804 is generated for the write data, and more specifically metadata is generated for each 4 KB data block that is generated from the write data. The generated metadata is stored as log entries in metadata logs 406b of the corresponding data objects. The metadata logs 406b can be persisted on an SSD 422 in a metadata recovery log 412b. For example, one or more log entries from each metadata log 406b can be written to a 4 KB data block 806, which in turn can be written to a metadata recovery log 412b. It is noted that the metadata logs 406b can be persisted in the same manner as the small-block logs shown in FIG. 3B. The metadata recovery log can be organized as a suitable write-optimized tree such as a log-structured merge (LSM) tree, a $B^\epsilon$ tree, and the like. An ACK is transmitted when the write operation to the SSD is completed.

It can be appreciated that the foregoing supports full-stripe writes in data striped storage, such as a RAID-6 array, in order to reduce write amplification when writing to the storage while at the same time being able to provide a persistent metadata recovery log with reduced write amplification.

Full-stripe writes are supported by first caching write data in local memory (e.g., memory banks 406a) rather than immediately flushing the data to the RAID-6 array. The data can be cached in fixed-size data blocks that match the block size of the RAID-6 array; e.g., 4 KB. Caching the write data to a corresponding memory bank reduces latency because we can delay the write operation to the RAID-6 array. A memory bank can be flushed when enough data has been stored in the memory bank to allow for one or more full-stripe write operations.

In order to avoid loss of data, and hence data corruption, in the event that the system crashes before the memory banks 406a can be flushed, the 4 KB blocks of write data 802 associated with clients' write requests and their corresponding metadata 804 can be persisted (e.g., on SSD devices) so that the system can reconstruct the memory banks during crash recovery. The write data 802 can be written to a data log 412a, for example, on an SSD. Because the data blocks 802 are sized at 4 KB, they completely fit a 4 KB data block on the SSD. However, if the blocks of metadata 804 corresponding to the data blocks are also written to the data log on the SSD, then an additional 4 KB data block on the SSD is required. Because each block of metadata 804 is on the order of several dozens of bytes or so, using an additional 4 KB block on the SSD to store the few blocks of metadata associated with a client's write request represents significant write amplification. If we do this for every metadata log, the result will be increased latency.

In accordance with the present disclosure, only the data blocks 802 comprising the write data are written to the data log. The corresponding blocks of metadata 804 can be written to a metadata recovery log 412b stored on another SSD, thus avoiding write amplification in the data log. In accordance with the present disclosure, the write amplification associated with the small blocks of metadata 804 discussed above can be reduced by combining blocks of metadata stored among the metadata logs 406b into 4 KB blocks of data, which are then written to the SSD.

In the event of a system crash, data stored in the memory banks 406a and metadata logs 406b that had not yet been written to the storage subsystem 416 can be lost, corrupted, or otherwise no longer available. As explained above, data stored in the memory banks 406a are persisted in the data log 412a and log entries comprising the metadata logs 406b are persisted in the metadata recovery log 412b. Together, the data log 412a and metadata recovery log 412b can be collectively referred to as the crash recovery information. The crash recovery process can include reading the data log 412a to rebuild the memory banks 406a and reading the metadata recovery log 412b to rebuild the metadata logs 406b.

Figure 9:
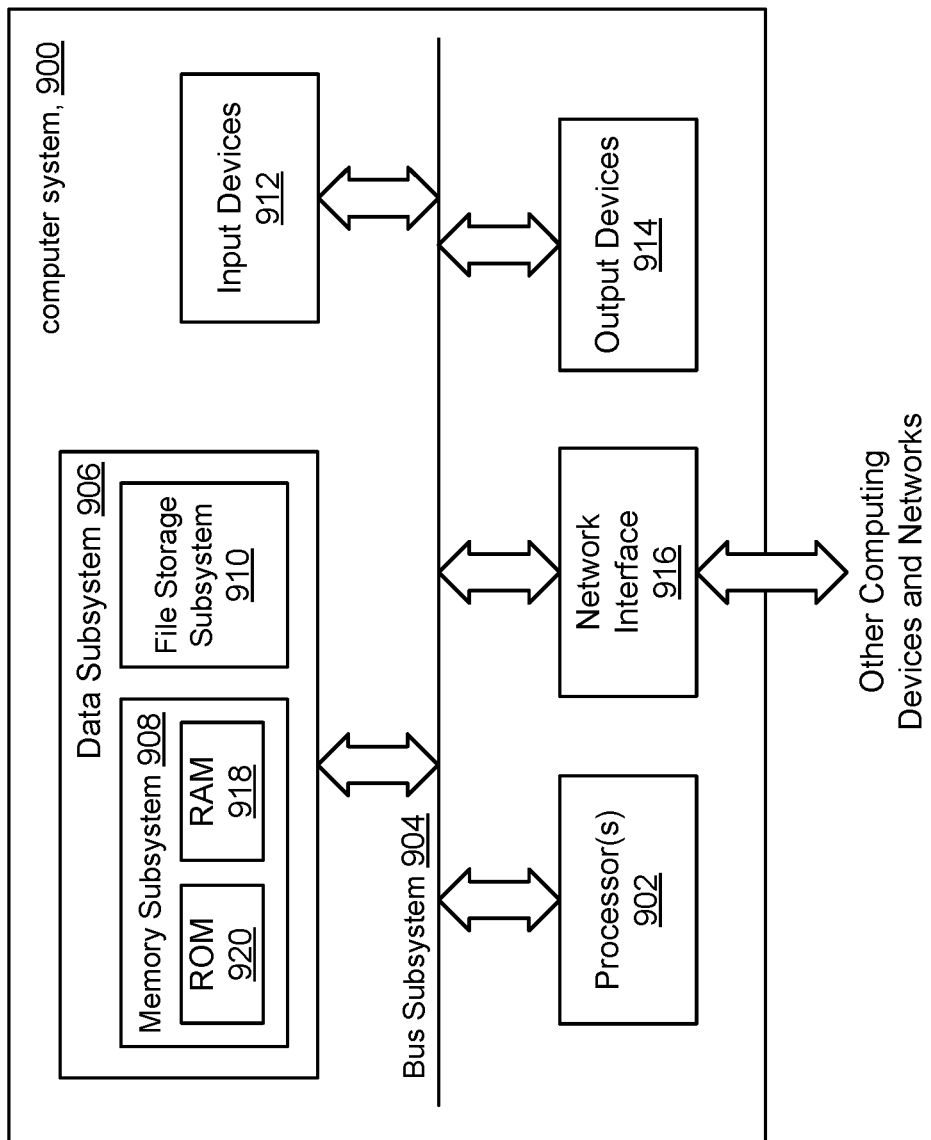
FIG. 9 shows a computing system adaptable for use in accordance with the present disclosure.

FIG. 9 depicts a simplified block diagram of an example computer system 900 according to certain embodiments. Computer system 900 can be used to implement an object manager (e.g., 102, 402) described in the present disclosure. As shown in FIG. 9, computer system 900 includes one or more processors 902 that communicate with a number of peripheral devices via bus subsystem 904. These peripheral devices include data subsystem 906 (comprising memory subsystem 908 and file storage subsystem 910), user interface input devices 912, user interface output devices 914, and network interface subsystem 916.

Bus subsystem 904 can provide a mechanism for letting the various components and subsystems of computer system 900 communicate with each other as intended. Although bus subsystem 904 is shown schematically as a single bus, alternative embodiments of the bus subsystem can utilize multiple busses.

Network interface subsystem 916 can serve as an interface for communicating data between computer system 900 and other computer systems (e.g., clients 12, 42). Embodiments of network interface subsystem 916 can include, e.g., an Ethernet card, a Wi-Fi and/or cellular adapter, digital subscriber line (DSL) units, and/or the like.

User interface input devices 912 can include a keyboard, pointing devices (e.g., mouse, trackball, touchpad, etc.), a touch-screen incorporated into a display, audio input devices (e.g., voice recognition systems, microphones, etc.) and other types of input devices. In general, use of the term "input device" is intended to include all possible types of devices and mechanisms for inputting information into computer system 900.

User interface output devices 914 can include a display subsystem, a printer, or non-visual displays such as audio output devices, etc. The display subsystem can be, e.g., a flat-panel device such as a liquid crystal display (LCD) or organic light-emitting diode (OLED) display. In general, use of the term "output device" is intended to include all possible types of devices and mechanisms for outputting information from computer system 900.

Data subsystem 906 includes memory subsystem 908 and file/disk storage subsystem 910 represent non-transitory computer-readable storage media that can store program code and/or data, which when executed by processor 902, can cause processor 902 to perform operations in accordance with embodiments of the present disclosure.

Memory subsystem 908 includes a number of memories including main random access memory (RAM) 918 for storage of instructions and data during program execution and read-only memory (ROM) 920 in which fixed instructions are stored. File storage subsystem 910 can provide persistent (i.e., non-volatile) storage for program and data files (e.g., data log 412a, crash recovery log 110, metadata recovery log 412b), and can include an SSD or other persistent storage such as NVM Express (NVMe, where NVM is short for Non-Volatile Memory Host Controller Interface Specification) devices, persistent memory, magnetic hard disk drive, an optical drive, a removable flash memory-based drive or card, and the like.

It should be appreciated that computer system 900 is illustrative and many other configurations having more or fewer components than system 900 are possible.

The various embodiments described herein may employ various computer-implemented operations involving data stored in computer systems. For example, these operations may require physical manipulation of physical quantities. Usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments may be useful machine operations. In addition, one or more embodiments also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

These and other variations, modifications, additions, and improvements may fall within the scope of the appended claims(s). As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments of the present disclosure along with examples of how aspects of the present disclosure may be implemented. The above examples and embodiments should not be deemed to be the only embodiments, and are presented to illustrate the flexibility and advantages of the present disclosure as defined by the following claims. Based on the above disclosure and the following claims, other arrangements, embodiments, implementations and equivalents may be employed without departing from the scope of the disclosure as defined by the claims.

The invention claimed is:

1. A method comprising:
receiving a write request comprising data to be written;
storing the data to be written as a plurality of fixed-size data blocks in a memory bank of a main memory of a computer system;
generating crash recovery information from the data to be written, including:
persisting, without data striping, the plurality of fixed-size data blocks on a first block storage device;
generating a plurality of metadata blocks from the data to be written; and
persisting, without data striping, the plurality of metadata to a second block-based storage device; and
subsequent to generating the crash recovery information, indicating an acknowledgement of the write request to the client; and
writing data stored in the memory bank of the main memory to a data striped storage system only when enough data is accumulated from subsequent write requests that the accumulated data can be written to the data striped storage system in one or more full-stripe write operations.

2. The method of claim 1, wherein the main memory of the computer system includes a plurality of metadata logs corresponding to a plurality of data objects, wherein the plurality of metadata is stored in a metadata log corresponding a data object associated with the received write request, wherein persisting the plurality of metadata to the second block-based storage device includes:
storing log entries from among the plurality of metadata logs into at least one fixed-size data block; and
persisting the at least one fixed-size data block to the second block-based storage device.

3. The method of claim 2, wherein the at least one fixed-size data block includes at least one log entry from each metadata log in the plurality of metadata logs.

4. The method of claim 2, wherein the one or more fixed-size data blocks are stored in a same data tree on the second block-based storage device.

5. The method of claim 1, further comprising:
receiving additional write requests from additional clients; and
generating additional pluralities of metadata blocks from the additional write requests,
wherein persisting the plurality of metadata to a second block-based storage device includes:
combining the plurality of metadata blocks with the additional pluralities of metadata blocks into one or more fixed-size data blocks; and
persisting the one or more fixed-size data blocks to the second block-based storage device.

6. The method of claim 1, further comprising using the crash recovery information to restore data stored in the bank of memory when the data becomes corrupted before the data is written to the storage system.

7. The method of claim 1, wherein the plurality of metadata blocks correspond respectively to the plurality of fixed-size data blocks, wherein a size of the fixed-size data blocks is larger than a size of the metadata blocks.

8. A non-transitory computer-readable storage medium having stored thereon computer executable instructions, which when executed by a computer device, cause the computer device to:
receive a write request comprising data to be written;
store the data to be written as a plurality of fixed-size data blocks in a memory bank of a main memory of the computer device;
generate crash recovery information from the data to be written, including:
persisting the plurality of fixed-size data blocks on a first block storage device;

generating a plurality of metadata blocks from the data to be written; and persisting the plurality of metadata to a second block-based storage device; and subsequent to generating the crash recovery information, indicate an acknowledgement of the write request to the client; and write data stored in the memory bank of the main memory to a data striped storage system only when enough data is accumulated from subsequent write requests that the accumulated data can be written to the data striped storage system in one or more full-stripe write operations.

9. The non-transitory computer-readable storage medium of claim 8, wherein the main memory of the computer device includes a plurality of metadata logs associated with a plurality of corresponding data objects, wherein the plurality of metadata is stored in a metadata log corresponding a data object associated with the received write request, wherein persisting the plurality of metadata to the second block-based storage device includes:

storing log entries from among the plurality of metadata logs into at least one fixed-size data block; and persisting the at least one fixed-size data block to the second block-based storage device.

10. The non-transitory computer-readable storage medium of claim 9, wherein the at least one fixed-size data block includes at least one log entry from each metadata log in the plurality of metadata logs.

11. The non-transitory computer-readable storage medium of claim 8, wherein the computer executable instructions, which when executed by the computer device, further cause the computer device to:

receive additional write requests from additional clients; and generate additional pluralities of metadata blocks from the additional write requests, wherein persisting the plurality of metadata to a second block-based storage device includes:

combining the plurality of metadata blocks with the additional pluralities of metadata blocks into one or more fixed-size data blocks; and persisting the one or more fixed-size data blocks to the second block-based storage device.

12. The non-transitory computer-readable storage medium of claim 11, wherein the one or more fixed-size data blocks are stored in a same data tree on the second block-based storage device.

13. The non-transitory computer-readable storage medium of claim 8, wherein the computer executable instructions, which when executed by the computer device, further cause the computer device to use the crash recovery information to restore data stored in the bank of memory when the data becomes corrupted before the data is written to the storage system.

14. The non-transitory computer-readable storage medium of claim 8, wherein the plurality of metadata blocks correspond respectively to the plurality of fixed-size data blocks, wherein a size of the fixed-size data blocks is larger than a size of the metadata blocks.

15. An apparatus comprising:
one or more computer processors;
a main memory; and
a computer-readable storage medium comprising instructions for controlling the one or more computer processors to:

receive a write request comprising data to be written;
store the data to be written as a plurality of fixed-size data blocks in a memory bank of the main memory;
generate crash recovery information from the data to be written, including:
    persisting the plurality of fixed-size data blocks on a first block storage device;
    generating a plurality of metadata blocks from the data to be written; and
    persisting the plurality of metadata to a second block-based storage device; and
subsequent to generating the crash recovery information, indicate an acknowledgement of the write request to the client; and
write data stored in the memory bank of the main memory to a data striped storage system only when enough data is accumulated from subsequent write requests that the accumulated data can be written to the data striped storage system in one or more full-stripe write operations.

16. The apparatus of claim 15, wherein the main memory includes a plurality of metadata logs associated with a plurality of corresponding data objects, wherein the plurality of metadata is stored in a metadata log corresponding a data object associated with the received write request, wherein persisting the plurality of metadata to the second block-based storage device includes:

storing log entries from among the plurality of metadata logs into at least one fixed-size data block; and persisting the at least one fixed-size data block to the second block-based storage device.

17. The apparatus of claim 16, wherein the at least one fixed-size data block includes at least one log entry from each metadata log in the plurality of metadata logs.

18. The apparatus of claim 15, wherein the computer-readable storage medium further comprises instructions for controlling the one or more computer processors to:

receive additional write requests from additional clients; and generate additional pluralities of metadata blocks from the additional write requests, wherein persisting the plurality of metadata to a second block-based storage device includes:

combining the plurality of metadata blocks with the additional pluralities of metadata blocks into one or more fixed-size data blocks; and persisting the one or more fixed-size data blocks to the second block-based storage device.

19. The apparatus of claim 18, wherein the one or more fixed-size data blocks are stored in a same data tree on the second block-based storage device.

20. The apparatus of claim 15, wherein the plurality of metadata blocks correspond respectively to the plurality of fixed-size data blocks, wherein a size of the fixed-size data blocks is larger than a size of the metadata blocks.

* * * * *